US010338240B2

(12) United States Patent
Berron et al.

(10) Patent No.: US 10,338,240 B2
(45) Date of Patent: Jul. 2, 2019

(54) METHOD AND SEISMIC VIBRATOR GUIDANCE SYSTEM BASED ON A FIELD ACQUIRED TRAJECTORY

(71) Applicant: CGGVERITAS SERVICES SA, Massy (FR)

(72) Inventors: Cecile Berron, Massy (FR); Eric Forgues, Bures-sur-Yvette (FR); Thomas Bianchi, Paris (FR); Thierry Klein, Saulx les Chartreux (FR)

(73) Assignee: CGG SERVICES SAS, Massy (FR)

( * ) Notice: Subject to any disclaimer, the term of this patent is extended or adjusted under 35 U.S.C. 154(b) by 1474 days.

(21) Appl. No.: 13/915,317

(22) Filed: Jun. 11, 2013

(65) Prior Publication Data

US 2014/0126326 A1    May 8, 2014

Related U.S. Application Data

(60) Provisional application No. 61/722,439, filed on Nov. 5, 2012.

(51) Int. Cl.
*G01V 1/38* (2006.01)
*G01V 1/00* (2006.01)

(52) U.S. Cl.
CPC ........ *G01V 1/003* (2013.01); *G01V 2210/612* (2013.01)

(58) Field of Classification Search
USPC ......................................................... 367/15
See application file for complete search history.

(56) References Cited

U.S. PATENT DOCUMENTS

| 4,970,697 | A | * | 11/1990 | Earley | .................. | G01V 1/3808 |
| | | | | | | 181/112 |
| 6,140,957 | A | * | 10/2000 | Wilson | .................. | G01C 15/00 |
| | | | | | | 342/357.32 |
| 6,643,576 | B1 | * | 11/2003 | O Connor et al. | ............. | 701/50 |
| 6,934,615 | B2 | * | 8/2005 | Flann et al. | ..................... | 701/50 |
| 7,804,738 | B2 | * | 9/2010 | Storteig | ............... | G01V 1/3861 |
| | | | | | | 367/16 |

(Continued)

FOREIGN PATENT DOCUMENTS

WO    2007/143741 A2    12/2007

OTHER PUBLICATIONS

Pelton—Land Energy Systems. Vib Pro(TM) Vibrator Control System. 2006. Input/Output, Inc. Revised Jun. 2006. 121043D.*

(Continued)

*Primary Examiner* — Isam A Alsomiri
*Assistant Examiner* — Jonathan D Armstrong
(74) *Attorney, Agent, or Firm* — Patent Portfolio Builders PLLC

(57) ABSTRACT

A method for improving a 4-dimensional (4D) repeatability by modifying a given path to be followed by a source during a seismic survey. The method includes receiving the given path at a control device associated with a vehicle that caries the source; following the given path during a first seismic survey that is a baseline survey for the 4D seismic survey; deviating from the given path to follow a new path when encountering an obstacle on the given path; and updating the given path, based on the new path, to obtain an updated given path when a deviation condition is met.

17 Claims, 5 Drawing Sheets

(56) References Cited

U.S. PATENT DOCUMENTS

| | | | | |
|---|---|---|---|---|
| 8,150,621 | B1* | 4/2012 | Phillips | G05D 1/0088 |
| | | | | 701/411 |
| 8,824,239 | B2* | 9/2014 | Welker | G01V 1/3817 |
| | | | | 367/15 |
| 2006/0178825 | A1* | 8/2006 | Eglington et al. | 701/211 |
| 2006/0256653 | A1* | 11/2006 | Toennessen | G01V 1/3826 |
| | | | | 367/16 |
| 2008/0019215 | A1* | 1/2008 | Robertsson | G01V 1/3808 |
| | | | | 367/19 |
| 2009/0118904 | A1* | 5/2009 | Birnie | 701/50 |
| 2009/0310439 | A1* | 12/2009 | Hauan | G01V 1/3835 |
| | | | | 367/21 |
| 2010/0118645 | A1* | 5/2010 | Welker | B63B 21/66 |
| | | | | 367/17 |
| 2010/0118650 | A1* | 5/2010 | Eick | G01V 1/24 |
| | | | | 367/38 |
| 2011/0266086 | A1* | 11/2011 | Welker et al. | 181/122 |

OTHER PUBLICATIONS

Vermeer, Gijsbertus Jan Otto. Fundamentals of 3-D seismic survey design. TU Delft, Delft University of Technology, 2001.*

Wzorek, Mariusz. "Selected aspects of navigation and path planning in unmanned aircraft systems." (2011). URL: http://www.diva-portal.org/smash/get/diva2:447052/FULLTEXT01.pdf.*

Search Report in corresponding European Application No. EP 13 19 1384 dated Feb. 22, 2017. (References D1, D2 and D3 were previously cited by the Examiner.).

* cited by examiner

METHOD AND SEISMIC VIBRATOR GUIDANCE SYSTEM BASED ON A FIELD ACQUIRED TRAJECTORY

CROSS REFERENCE TO RELATED APPLICATIONS

This application claims priority and benefit from Provisional Patent Application No. 61/722,439, filed Nov. 5, 2012, for "Seismic Vibrator Guidance System based on a Field Acquired Trajectory to Improve 4D repeatability of the Following Surveys," the entire contents of which are incorporated herein by reference.

BACKGROUND

Technical Field

Embodiments of the subject matter disclosed herein generally relate to methods and systems and, more particularly, to mechanisms and techniques for determining a field trajectory for a land-based seismic survey to improve 4-dimensional (4D) repeatability.

Discussion of the Background

During the past years, interest in monitoring oil and/or gas reserves has increased. Time-lapse (or 4D) seismic monitoring of producing oil fields is an accepted optimization method for field development and product recovery, providing significant recovery rate improvements and drilling cost savings.

Time-lapse seismic reservoir monitoring is the comparison of 3D seismic surveys at two or more points in time. Time-lapse seismic reservoir monitoring also has potential for increasing ability to image fluid movement between wells. A traditional configuration for achieving a 4D land seismic monitoring is illustrated in FIG. 1, which shows a system 10 that includes plural receivers 12 positioned over an area 12a of a subsurface to be explored and in contact with the surface 14 of the ground. A number of vibroseismic sources 16 (e.g., located on corresponding trucks) are also placed on the surface 14 in area 16a, in the vicinity of area 12a of the receivers 12. A recording device 18 is connected to the plurality of receivers 12 and placed, for example, in a station truck 20. Each source 16 may be composed of a variable number of vibrators, typically between one and five, and may include a local controller 22. A central controller 24 may be present to coordinate the sources' 16 shooting times. A global positioning system (GPS) 26 may be used to time-correlate the sources 16 and receivers 12.

With this configuration, sources 16 are controlled to generate seismic waves, and the plurality of receivers 12 record waves reflected by the oil and/or gas reservoirs and other structures. The seismic survey may be repeated at various time intervals, e.g., months or years apart, to determine changes in the reservoir. For reservoir monitoring, it is traditional to maintain the receivers at their locations in the field over the entire time of the 4D surveys (i.e., not to remove the receivers at the end of a first survey and to deploy them again at the beginning of a second survey). It is also customary to have mobile sources that move from location to location and shoot seismic waves. For this case, when the first survey ends, the sources are removed, and when the second survey starts, the same sources or other sources are brought back in.

For this situation, it is desirable to position and shoot the sources at the same geographic positions during each survey, i.e., the first survey, the second survey, etc., of the 4D survey. However, the following problems are noted in practical situations. FIG. 2 shows a system 200 that includes plural sources 202 and plural receivers 204. A single source 202 is shown for simplicity. The receivers are fixed, i.e., their locations do not change during the 4D survey. However, the sources are truck-mounted and they carried from one shooting position to another by truck. This means that the truck driver 206 is instructed to follow a given path 210 each time an area 211 is surveyed. Path 210 is traditionally pre-calculated by the operator of the seismic survey, usually at its facilities, which can be hundreds, if not thousands, of miles from the surveyed area 211.

Because the operator relies on maps for determining path 210, which may not be accurate or omit certain details that influence the path actually followed by the driver, path 210 can intersect with an obstacle or avoidance 214 (e.g., a hill, a pond, a man-made structure, a boulder, etc.). In one case, the given path does not match the truck specifications (e.g., steering angle too wide, steep slope which the truck cannot climb, etc.). Consequently, the driver cannot follow given path 210 and cannot shoot source 202 at the required locations 210A, 210B, etc. In these situations, the driver takes the liberty of deviating from given path 210 and following another path 216, which the driver believes to be close enough to given path 210. This means that source 202 is shot at locations 216A, 216B, etc. However, the driver's choice may change from survey to survey, thus, introducing undesirable inaccuracies in the collected seismic data (geographic discrepancies 220 between the intended shooting positions and the positions actually shot, which vary along the path).

Given the fact that operators try to understand the behavior of the reservoir over time by qualitatively and quantitatively quantifying these effects, 4D reservoir monitoring is very sensitive to shooting sources at the same locations when the survey is repeated.

Thus, there is a need for developing a device and a method for minimizing geographic discrepancies between shoots intended to be performed at the same position over time.

SUMMARY

According to one exemplary embodiment, there is a method for modifying a given path to be followed by a source during a 4-dimensional (4D) seismic survey. The method includes receiving the given path at a control device associated with a vehicle that caries the source; following the given path during a first seismic survey that is a baseline survey for the 4D seismic survey; deviating from the given path to follow a new path when encountering an obstacle along the given path; and updating the given path, based on the new path, to obtain an updated given path when a deviation condition is met.

According to another embodiment, there is a control device configured to modify a given path to be followed by a source during a 4-dimensional (4D) seismic survey. The control device includes an interface configured to receive the given path; and a processor connected to the interface. The processor is configured to monitor the given path during a first seismic survey that is a baseline survey for the 4D seismic survey, track a deviation from the given path when the source follows a new path when encountering an obstacle along the given path, and update the given path, based on the new path, to obtain an updated given path when a deviation condition is met According to still another exemplary embodiment, there is a computer readable medium including computer executable instructions, wherein the instructions, when executed by a processor, implement the above discussed method.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a seismic system having a single source that is being shot at desired geographical positions over a period of time. However, the embodiments to be discussed next are not limited to a single source, but are applicable to systems with many sources. Also, the following embodiments are discussed with regard to a land seismic survey. However, the following embodiments are equally applicable to a marine seismic survey.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, there is a method for modifying a given path that needs to be followed by a source during a first seismic survey to account for various obstacles and avoidances the source encounters. Once the modified given path has been followed during a first seismic survey that is part of a 4D seismic survey, the system uses this modified given path as the new given path to be followed by sources in subsequent surveys. In this way, discrepancies between geographical locations of the sources during repeat shootings over time are minimized.

Figure 1:
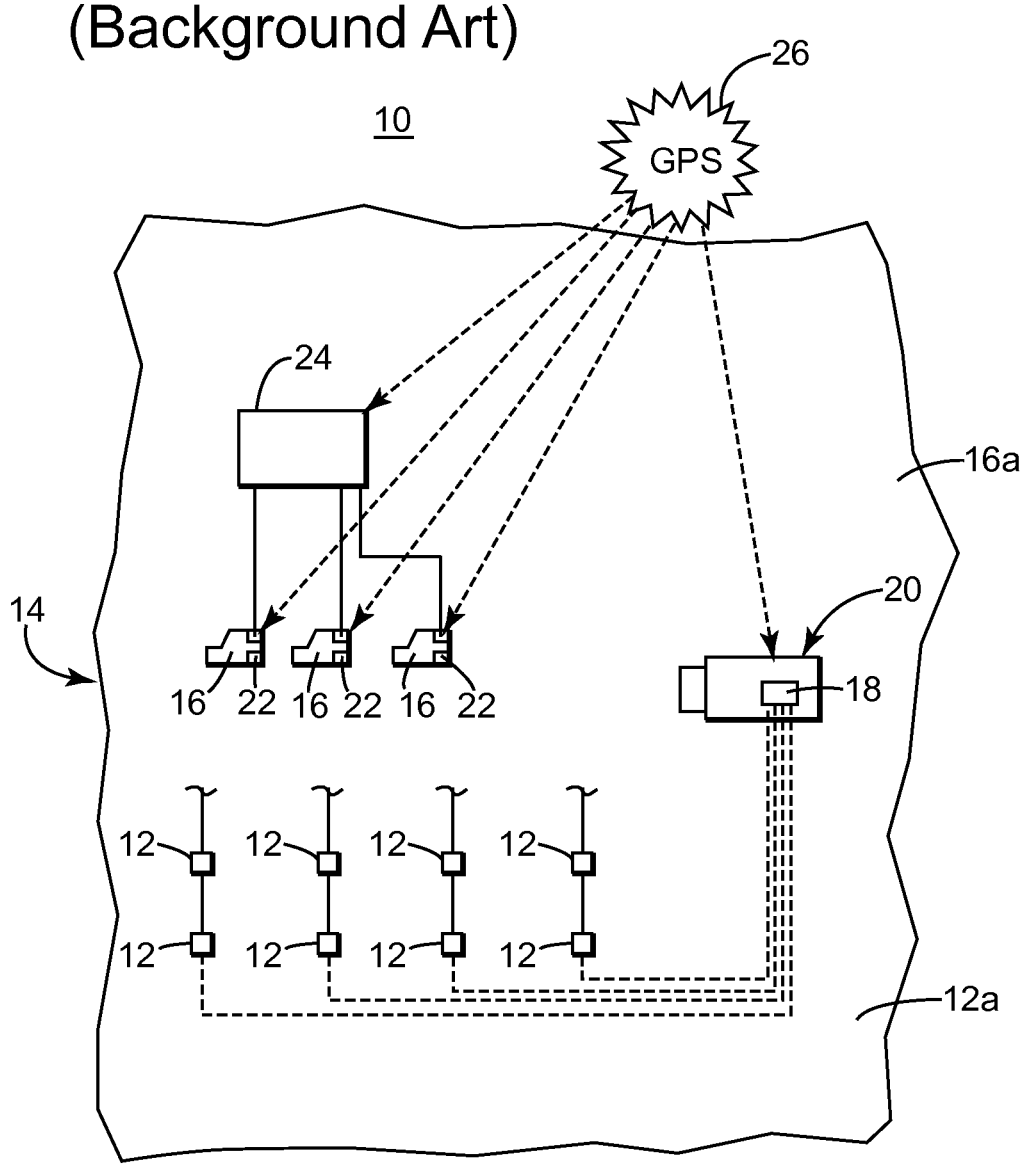
FIG. 1 is a schematic diagram of a conventional onshore seismic data acquisition system.
Figure 2:
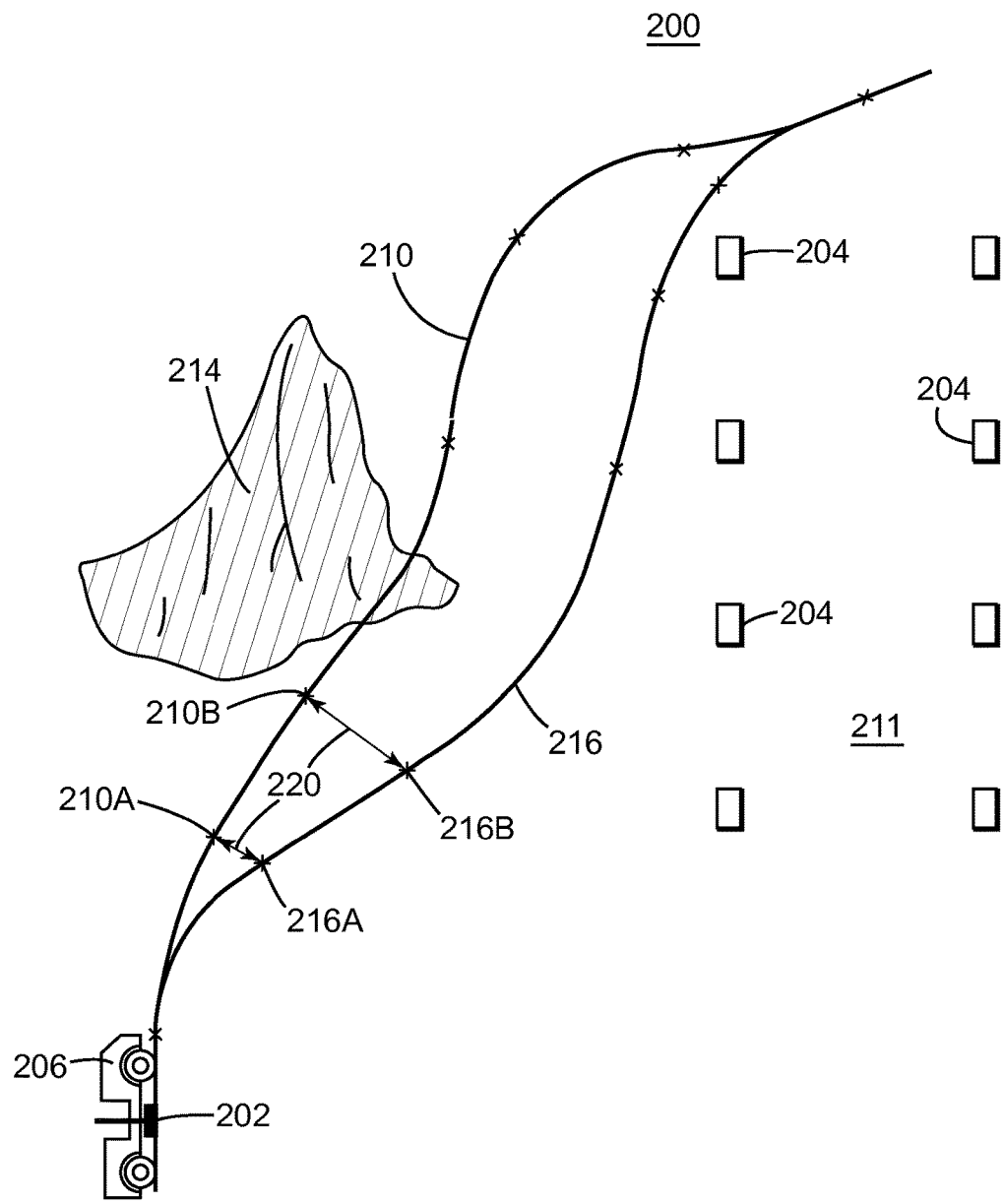
FIG. 2 is a schematic diagram of a 4D land seismic data acquisition system.
Figure 3:
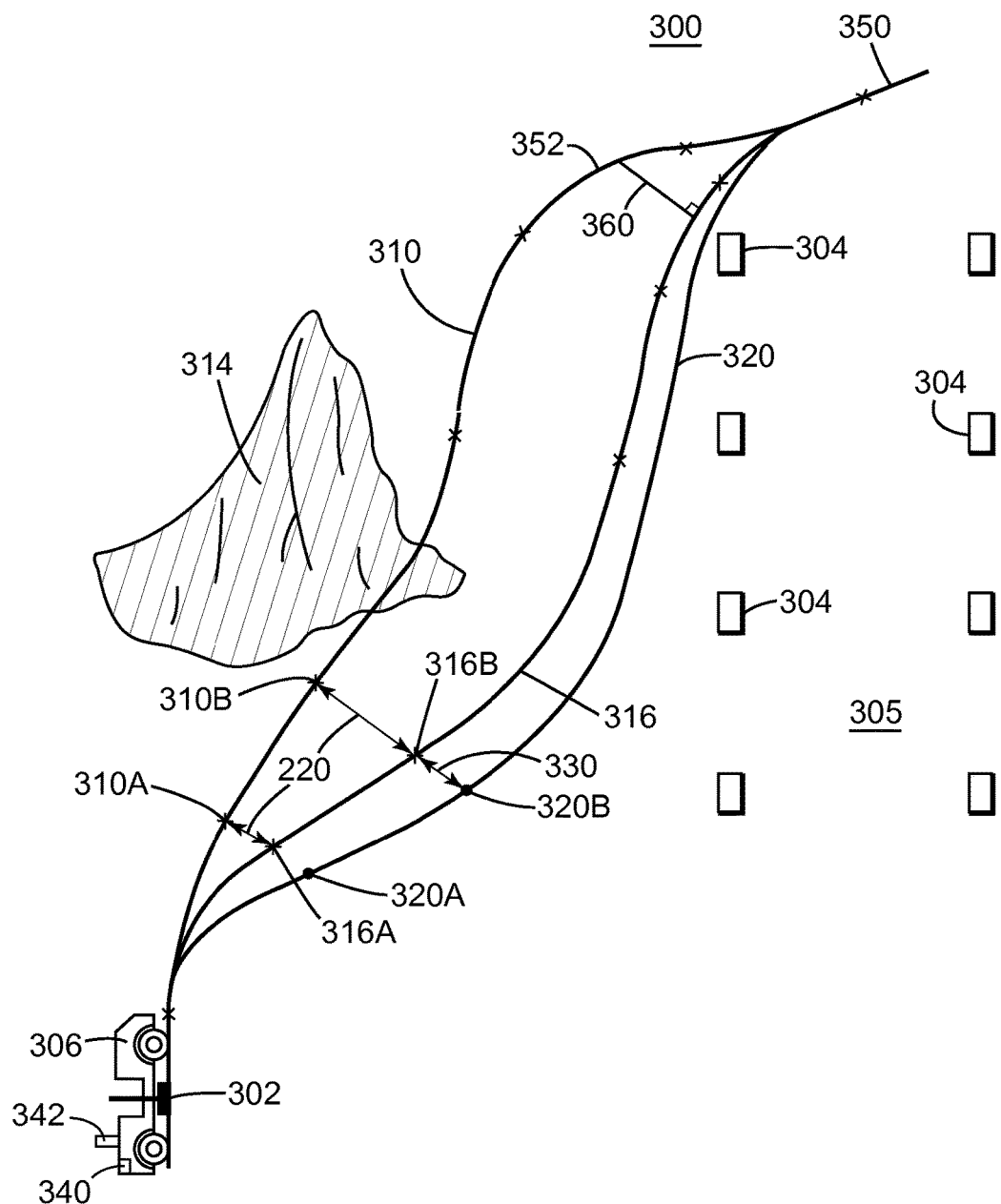
FIG. 3 is a schematic diagram of a novel 4D land seismic data acquisition system according to an exemplary embodiment.

According to an exemplary embodiment illustrated in FIG. 3, a seismic survey system 300 includes one or more trucks 306 (only one is shown) carrying corresponding sources 302 and plural receivers 304 distributed over an area 305 to be surveyed. The truck 306 is given a path 310 to follow, and this path is calculated prior to the survey, e.g., at the operator's facilities. However, an obstacle 314 or an avoidance induced by truck specifications, unknown to the operator, disrupts given path 310. Thus, when the truck is in the field and follows given path 310 and has to shoot the source 302 at given locations 310A and 310B, the driver is suddenly faced with obstacle 314. The driver then takes the liberty, as is typically done, of altering the truck's path and following a new path 316 that (partially) deviates from given path 310. However, new path 316 avoids obstacle or avoidance 314.

The truck 306 has on board a control device 340 (that may include a processor, storage device, input/output interface, screen, Internet connection, etc.) and a location device 342 (e.g., GPS) that tracks the location of the truck relative to Earth and/or given path 310. The control device 340, or its operator in the truck, when faced with following a new path 316 instead of given path 310, may decide to accept new path 316 as the given path, i.e., to alter/modify given path 310 to coincide with new path 316. This process may alter/modify one or more portions of given path 310. In this way, new given path 316 takes into account obstacle or avoidance 314 and allows, the next time the survey is performed, the truck to follow this path.

According to an exemplary embodiment, this alteration/modification of the new path 310 is allowed only the first time the truck performs the survey, i.e., the first seismic survey in a series of seismic surveys that constitute the 4D seismic survey. In one application, this alteration/modification is only allowed when deviation of new path 316 relative to given path 310 is larger than a given threshold. This last condition (deviation condition) may be imposed for the following reason. The location device 342 acquires a location of the truck with a given error. Considering a simple example, suppose that this error is 1 m. If the truck is exactly on given path 310, and the location device 342 determines that the truck is 1 m away from the given path, it is undesirable to consider this deviation as a new path and to modify the given path. For this reason, a given threshold is entered and only if the deviation of the truck from the given path, including the error of the location device, is larger than the threshold, the control device will modify the given path. For the example considered in this paragraph, the threshold may be set to 2 m. However, these numbers are exemplary and not intended to limit the applicability of the novel method. Other values for the threshold may be used, depending on the accuracy of the location device and other characteristics of the seismic survey.

Regarding the shooting positions 310A, 310B, etc., note that these positions are also affected by the new given path 316. The shooting positions are input into the control device and they specify a geographical location where the source should be and a time at which that source is shot. By changing given path 310 to new given path 316, the shooting positions are also changed to lie on new given path 316. Note that the sources may be shot in various modes, i.e., sequentially, simultaneously, flip-flop, flip-flop with a certain delay, etc. In one exemplary embodiment, geographical locations 310A, 310B, etc., are translated into geographical locations 316A, 316B, etc., by simply drawing perpendicular segments 360 from geographical locations 310A, 310B, etc. to the new given path 316. In one application, the segments are not perpendicular on the given path or the new path, but rather are defined to have minimum values.

Returning to FIG. 3, suppose that the truck tried to follow given path 310 for the first time, but was unable to do so because of obstacle or avoidance 314. Thus, the truck followed path 316. In this situation, the control device (or the operator) accepts new path 316 as the given path, i.e., original given path 310 is updated with the geographical locations of new path 316 to obtain the new given path (310, 316). Also, assume that the truck follows new path 316 at time t0.

When the survey is repeated again at time t1>t0, for example, after a few months or more, the new given path the truck needs to follow is given path 310 combined with new path 316, and not original given path 310. Note that truck 306 might physically be another device that the one that was used during the previous survey. However, in the field the truck 306 might follow an actual path 320 that is neither given path 310 nor new path 316. This may happen because of location device 342 inaccuracy or other reasons. However, the deviation 330 between the actual path 320 and the new given path 310 and 316 is usually below the threshold. In one application, deviation 330 is smaller than deviation 220. Note that parts 350 of original given path 310 may be identical to corresponding parts of new given path 310 and 316, while only some parts 352 of original given path 310 are modified.

Figure 4:
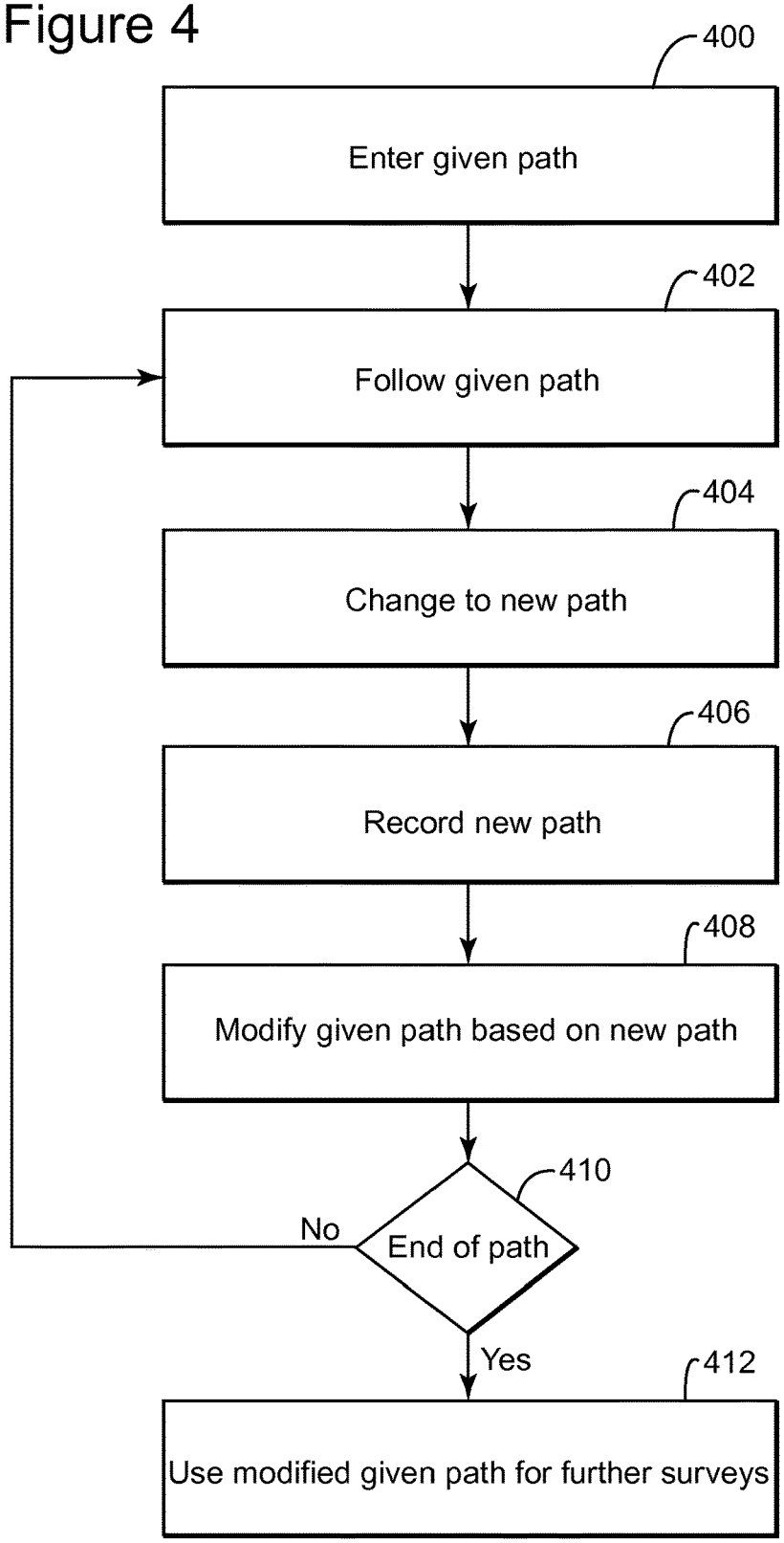
FIG. 4 is a flowchart illustrating a method for determining a new given path according to an exemplary embodiment.

A method that illustrates modification of the given path for a 4D survey is discussed now with respect to FIG. 4. In step 400, a given path 310 is entered into the control device of the truck that carries a source for seismic shooting. The given path may include not only the geographical path for the truck to follow, but also shooting positions and shooting times associated with the given path. In step 402, the truck follows for the first time given path 310 and starts shooting the sources at the given locations and given times. Note that the truck may stop at the shooting positions for shooting the source. However, at a certain position along given path 310, the driver faces obstacle 314 and decides in step 404 to abandon the given path and follow a new path that avoids the obstacle. The new path 316 is recorded in step 406 by the truck's control device until the truck arrives back at given path 310. The coordinates of new path 316 may be used for future surveys instead of the corresponding coordinates of given path 310. If that is the case, given path 310 is modified in step 408 to incorporate new path 316. This step may be performed automatically, by the control device, or manually by the operator of the seismic survey. If performed automatically, the control device may have a given threshold that is compared with the deviation (a difference) between the two paths. If the deviation is higher than the threshold, the control device automatically modifies given path 310. Other algorithms may be used to make this decision. The deviation may be defined in various ways by using various metrics. For example, deviation 360 (see FIG. 3) may be a segment between given path 310 and new path 316, and deviation segment 360 may be perpendicular on at least one of the two paths. In another application, a length of segment 360 is minimized. Any deviation metrics between two paths can be used for this purpose.

In step 410, the control device verifies whether the end of the path has been reached. Note that "end the path" can be the end of a subsection of the survey that will be repeated before the whole survey has been shot. If the answer is no, the algorithm returns to step 402. If the answer is yes, the algorithm advances to step 412, in which the modified path becomes the new given path for further surveys. As noted above, step 408 applies only when the truck follows the given path for the first time. Once the truck has followed the given path and it was modified as discussed above, the control device stores the modified given path and does not allow the system to change it, even if the truck deviates from the modified/new given path the next time a survey is performed. This ensures that all seismic surveys that are part of the 4D survey follow the same given path.

Step 408 may also include a sub-step of recalculating the shooting positions for the sources. In this sub-step, the new shooting positions are recalculated based, for example, on perpendicular lines as previously discussed. However, it is possible to calculate the new shooting positions based on other criteria. Various distance or time metrics can be here used or specifically developed. This step may be performed, in real time, by the control device associated with the source. In another device, the step is performed remotely, e.g., at the operator facility and transmitted in real time to the source.

Figure 5:
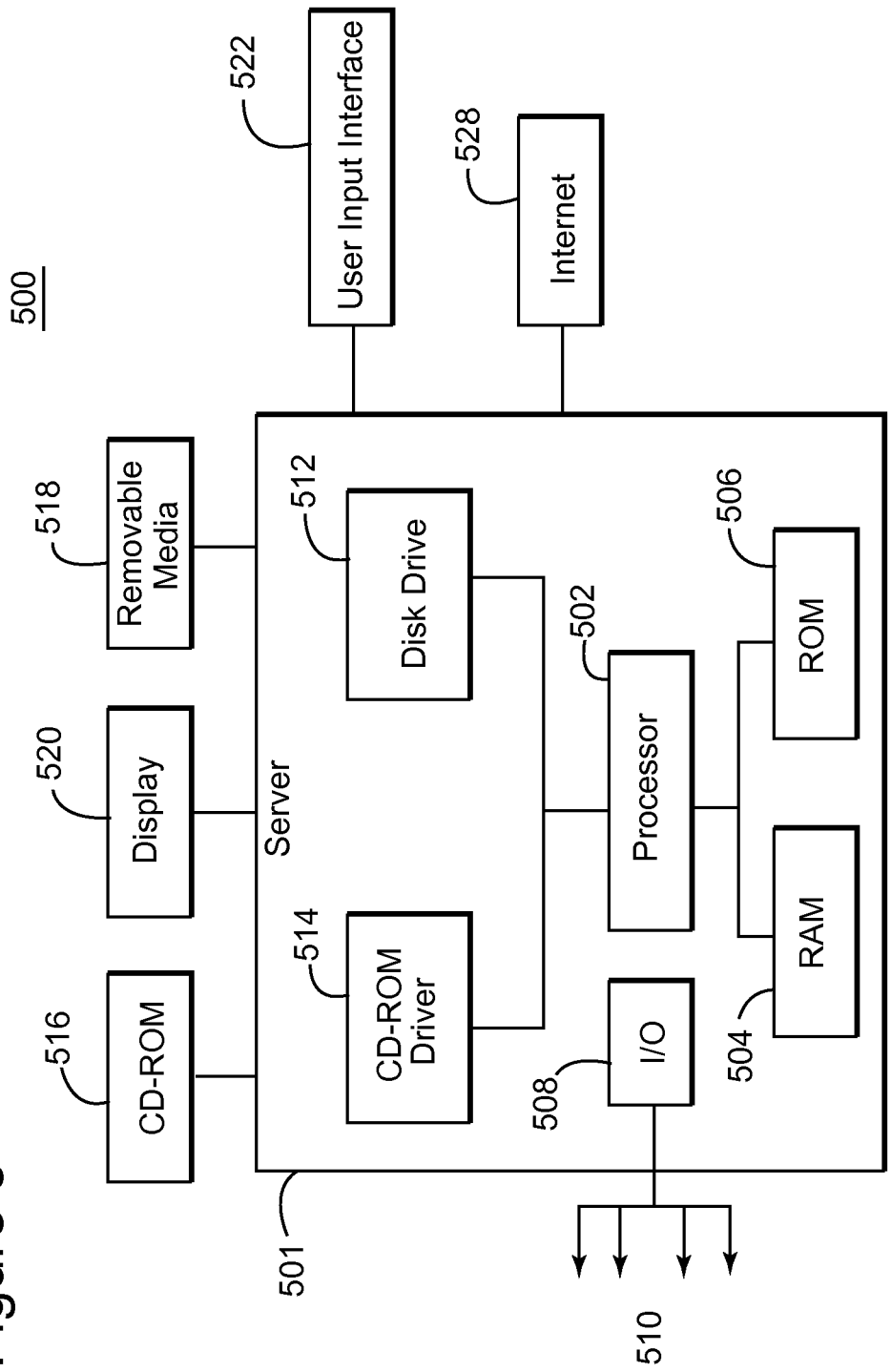
FIG. 5 is a schematic diagram of a computing device.

For purposes of illustration and not of limitation, an example of a representative computing device capable of carrying out calculations in accordance with the exemplary embodiments is illustrated in FIG. 5. Hardware, firmware, software or a combination thereof may be used to perform the various steps and operations described herein.

The exemplary computing device 500 suitable for performing the activities described in the exemplary embodiments may include a server 501. Such a server 501 may include a central processor (CPU) 502 coupled to a random access memory (RAM) 504 and to a read-only memory (ROM) 506. The ROM 506 may also be other types of storage media to store programs, such as programmable ROM (PROM), erasable PROM (EPROM), etc. The processor 502 may communicate with other internal and external components through input/output (I/O) circuitry 508 and bussing 510 to provide control signals and the like. The processor 502 carries out a variety of functions as are known in the art, as dictated by software and/or firmware instructions.

The server 501 may also include one or more data storage devices, including hard disk drives 512, CD-ROM drives 514, and other hardware capable of reading and/or storing information such as DVD, etc. In one embodiment, software for carrying out the above-discussed steps may be stored and distributed on a CD-ROM 516, portable media 518 or other form of media capable of portably storing information. These storage media may be inserted into, and read by, devices such as the CD-ROM drive 514, the disk drive 512, etc. The server 501 may be coupled to a display 520, which may be any type of known display or presentation screen, such as LCDs, LED displays, plasma displays, cathode ray tubes (CRT), etc. A user input interface 522 is provided, including one or more user interface mechanisms such as a mouse, keyboard, microphone, touch pad, touch screen, voice-recognition system, etc.

The server 501 may be coupled to other computing devices, such as a landline and/or wireless terminals, via a network. The server may be part of a larger network configuration as in a global area network (GAN) such as the Internet 528, which allows ultimate connection to the various landline and/or mobile client devices.

The disclosed exemplary embodiments provide a system and a method for modifying a given path to be followed by a seismic source during a 4D seismic survey. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for modifying a given path to be followed by a source during a 4-dimensional (4D) seismic survey, the method comprising:
   receiving the given path, comprising given shooting positions, at a control device on board a vehicle that caries the source, each given shooting position specifying a geographical location along the given path where the source is shot;
   during a first seismic survey that is a baseline survey for the 4D seismic survey,
      driving the vehicle around an obstacle that is encountered while following the given path, which results in deviating the vehicle from the given path, thus generating a new path, the new path comprising at least one new shooting position corresponding to one of the given shooting positions and
      updating the given path, based on the new path, when a deviation condition is met,
   wherein the given path is not further updated during any seismic survey of the 4D seismic survey subsequent to the baseline seismic survey.

2. The method of claim 1, further comprising:
   recording the new path when deviating from the given path; and
   substituting geographical positions of the given path with corresponding geographical positions of the new path to update the given path.

3. The method of claim 1, where the updating further comprises:
   calculating a difference between the given path and the new path;
   comparing the difference with a threshold; and
   automatically updating the given path when the difference is larger than the threshold.

4. The method of claim 1, wherein the new path corresponds to a portion of the given path.

5. The method of claim 1, wherein given shooting positions of the source along a portion of the given path, that is not followed by the source during the baseline survey, are translated into new shooting positions along the new path.

6. The method of claim 5, wherein the new shooting positions translated on the new path are calculated by the control device in real-time or post-processing.

7. The method of claim 6, further comprising:
   calculating the new shooting positions by determining intersections of the new path with segments originating at the given shooting positions.

8. A control device configured to modify a given path to be followed by a source during a 4-dimensional (4D) seismic survey, the control device comprising:
   an interface configured to receive the given path comprising given shooting positions, each given shooting position specifying a geographical location along the given path where the source is shot; and
   a processor connected to the interface and configured to,
      monitor the given path during a first seismic survey that is a baseline survey for the 4D seismic survey,
      track a deviation from the given path when the source encounters an obstacle along the given path, which results in the source following a new path comprising at least one new shooting position corresponding to one of the given shooting positions, and
      update the given path, based on the new path, when a deviation condition is met,
   wherein the given path is not further updated during any seismic survey of the 4D seismic survey subsequent to the baseline seismic survey.

9. The control device of claim 8, wherein the processor is further configured to:
   record the new path when deviating from the given path; and
   substitute geographical positions of the given path with corresponding geographical positions of the new path to update the given path.

10. The control device of claim 8, wherein the processor is further configured to:
    calculate a difference between the given path and the new path;
    compare the difference with a threshold; and
    automatically update the given path when the difference is larger than the threshold.

11. The control device of claim 8, wherein the new path corresponds to a portion of the given path.

12. The control device of claim 8, wherein the processor is further configured to:
    translate given shooting positions of the source along a portion of the given path, that is not followed by the source during the baseline survey, into new shooting positions along the new path.

13. The control device of claim 12, wherein the new shooting positions translated on the new path are calculated by the processor in real-time or post-processing.

14. The control device of claim 13, wherein the processor is further configured to:
    calculate the new shooting positions by determining intersections of the new path with segments originating at the given shooting positions,
    wherein the segments are perpendicular on the new path.

15. A non-transitory computer readable medium including computer executable instructions, wherein the instructions, when executed by a processor, implement a method for modifying a given path to be followed by a source during a 4-dimensional (4D) seismic survey, the method comprising:
    receiving the given path, comprising given shooting positions, at a control device on board a vehicle that caries the source, each given shooting position specifying a geographical location along the given path where the source is shot;
    during a first seismic survey that is a baseline survey for the 4D seismic survey
       driving the vehicle around an obstacle that is encountered while following the given path, which results in deviating the vehicle from the given path, thus generating a new path, the new path comprising at least one new shooting position corresponding to one of the given shooting positions, and
       updating the given path, based on the new path, when a deviation condition is met, wherein the given path is not further updated during any seismic survey of the 4D survey subsequent to the baseline seismic survey.

16. The non-transitory computer-readable medium of claim 15, further comprising:
recording the new path when deviating from the given path; and
substituting geographical positions of the given path with corresponding geographical positions of the new path to update the given path.

17. The non-transitory computer-readable medium of claim 15, further comprising:
calculating a difference between the given path and the new path;
comparing the difference with a threshold; and
automatically updating the given path when the difference is larger than the threshold.

* * * * *